Feb. 25, 1947.   B. SHIPMAN ET AL   2,416,353
MEANS FOR VISUALLY COMPARING SOUND EFFECTS
DURING THE PRODUCTION THEREOF
Filed Feb. 6, 1945   3 Sheets-Sheet 1
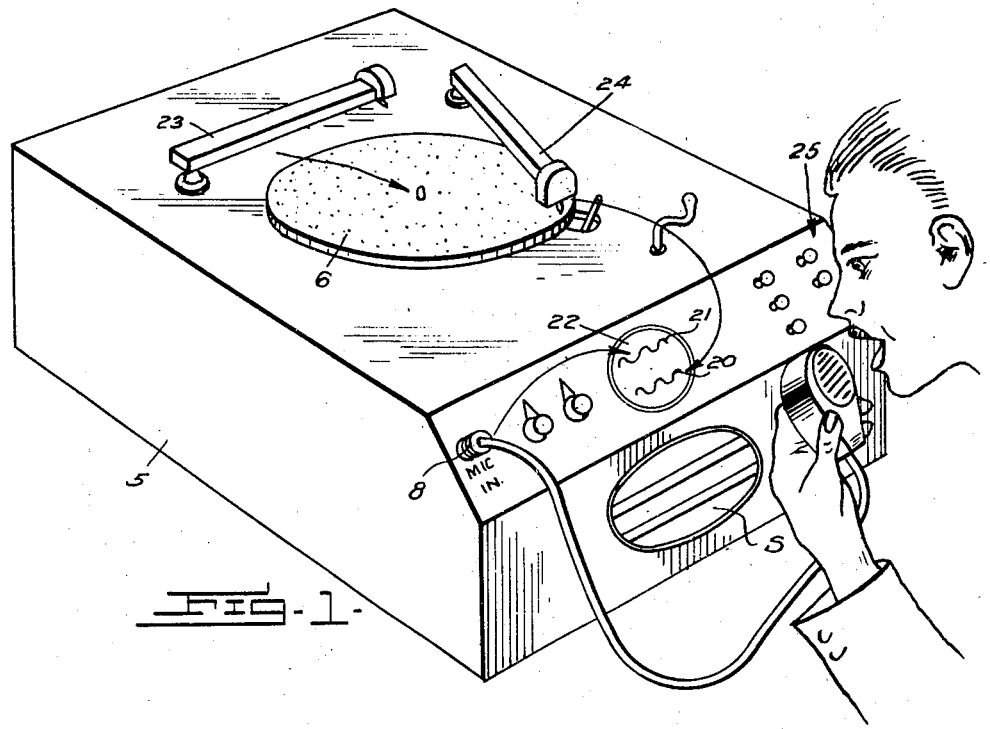
FIG.-1.-
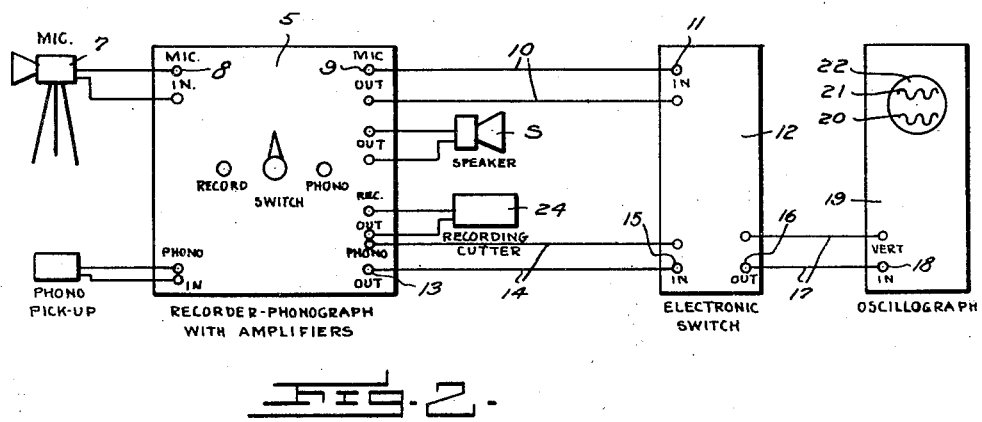
FIG.-2.-
INVENTOR.
Barry Shipman and
Robert H. Guhl
BY
Shepherd Campbell INVENTORS,
Barry Shipman and
Robert H. Guhl
BY
Shepherd Campbell Patented Feb. 25, 1947

2,416,353

UNITED STATES PATENT OFFICE 2,416,353

MEANS FOR VISUALLY COMPARING SOUND EFFECTS DURING THE PRODUCTION THEREOF

Barry Shipman, Pasadena, and Robert H. Guhl, Van Nuys, Calif.

Application February 6, 1945, Serial No. 576,460

10 Claims. (Cl. 35—1)

1

Broadly stated, the object of the invention is to provide means through which sound effects of many kinds, such as those produced by the spoken or singing voice or by an instrument or instruments, may be visually compared with the closely related sound effects simultaneously produced by another source of sound such as a phonograph record, another instrument or another singing or speaking voice.

Various ways of accomplishing the foregoing results as well as the manifold advantages flowing therefrom will be best understood after an understanding of the accompanying drawings and the following description, and such advantages will be hereinafter set forth.

In the accompanying drawings:

Figure 1 is a diagrammatic perspective view of one embodiment of the invention;

Fig. 2 is a block diagrammatic view illustrating the relationship between the several elements of the apparatus, in which two patterns to be compared are produced upon the screen of a single oscillograph;

Figure 6:
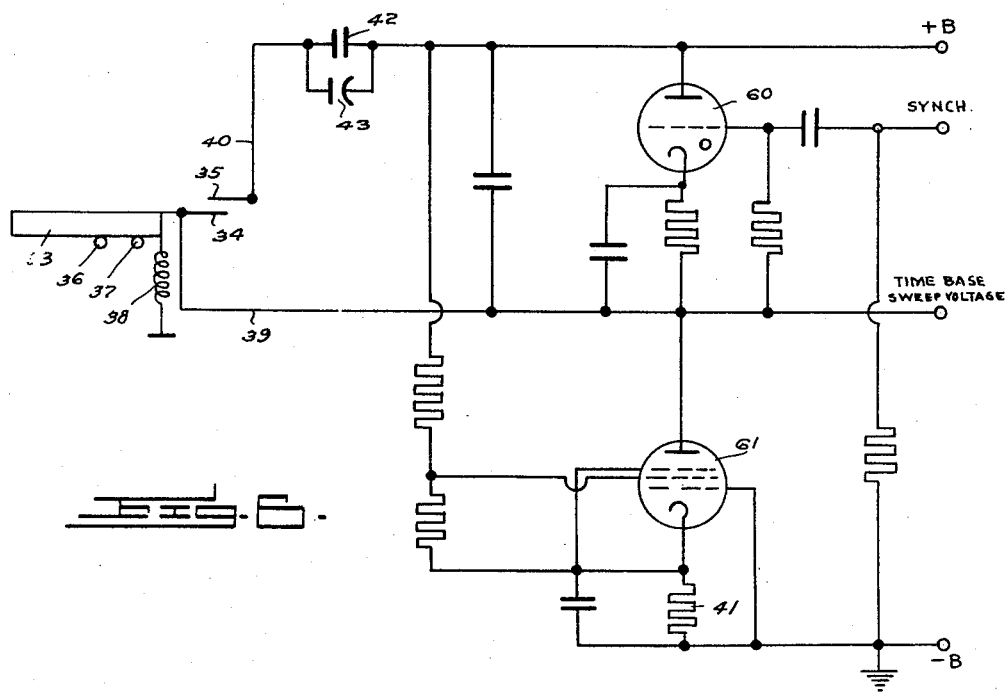
Figure 7:
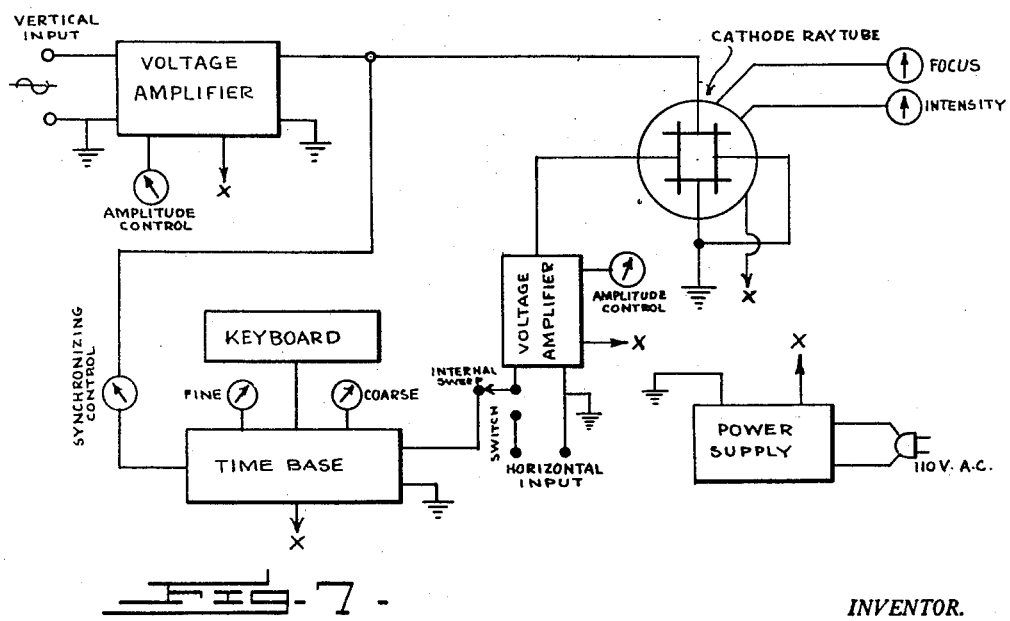

Fig. 6 is a block diagrammatic view of a conventional simple sweep frequency oscillator circuit (time base), hereinafter described, and Fig. 7 is a block diagrammatic view of the elements of a conventional oscillograph embodying means for manually modifying the horizontal scanning effect of the time base circuit of the oscillograph by means of a keyboard in order to obtain a useful visualization of sound effects as hereinafter set forth. In Fig. 7, X indicates the power output lead from the power supply and also the corresponding input leads to the several elements such as the cathode ray tube, and amplifiers.

Like numerals designate corresponding parts throughout the several figures of the drawings.

In the particular form of the invention illustrated in Fig. 2, the desired result is secured by the employment of conventional apparatus readily purchasable upon the open market and

2 the detailed construction of which is independent of this invention. Assuming, for example, that it is desired visually to compare the effect produced by a person singing a given song with the visual effect produced by a phonograph record playing the same song, the desired effect is secured by delivering the output from the microphone into which the person is singing to one input terminal of an electronic switch, delivering the phonograph output to the other input terminal of the electronic switch and connecting the output terminal of said electronic switch to the input terminal of a conventional oscillograph.

An oscillograph is an electronic device which permits the instantaneous visualization of alternating electrical currents or voltages. Illustrated in Fig. 6 is a block diagram including all of the component parts necessary to obtain oscillographic patterns.

In operation the pattern is formed on the fluorescent screen of the cathode-ray tube by the fact that the time base voltage causes the electronic stream in the cathode-ray tube to sweep back and forth horizontally at a definite and controlled rate of frequency. When an alternating current or voltage is amplified in the vertical amplifier and applied to the vertical deflection plates, located in the cathode-ray tube, it causes the cathode-ray tube's electronic stream to be deflected in a vertical direction. Thus the fluorescent spot of light, formed on the cathode-ray tube's screen by the electronic stream striking said screen, moves in such a manner as to trace a resultant pattern which is a component of the combining of the horizontal motion at a specific frequency, of the time base voltage and the vertical motion and frequency of the alternating current or voltage under study. Since the pattern upon the screen 22 which depicts the action of the phonograph is the pattern which the singer tries to match, this pattern, the sound producing the same and the electric impulses which convert said sound into the visual recording upon the screen may be considered a master sound effect to distinguish it from the like effects produced by the singer or student attempting to match the same.

It may also be stated that an electronic switch has the capability of switching two different alternating currents or voltages back and forth with such rapidity that when such a switch is connected, as herein described, to the input of an oscillograph, it causes two complete traces of the alternating currents or voltages to appear on the screen of the oscillograph, one in the upper half and one in the lower half of the screen of the cathode-ray tube.

Conventional apparatus which we contemplate employing and which will give the desired results may comprise a Du Mont type 168 cathode-ray oscillograph, and a Du Mont type 185 electronic switch, catalog No. 1072, both being manufactured by the Allen B. Du Mont Laboratories, Inc., of Passaic, New Jersey. Any suitable type of microphone may be used, such, for example, as the Shure Unidyne Cardiod dynamic microphone—model 55B—200-250 ohms impedance.

Figure 5:
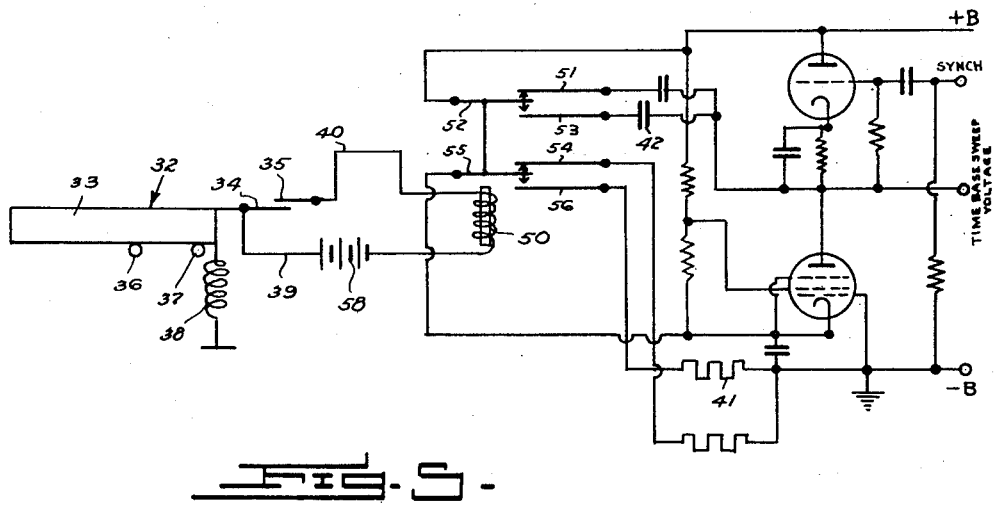
Fig. 5 is a side view of one of the keys of said keyboard, illustrating the association therewith of an electronic circuit, embracing means for manually modifying the horizontal scanning effect of the time base circuit of the oscillograph.

Referring to the drawings, and particularly Figs. 1 and 2, 5 designates what may be the case of a machine very similar to the conventional recording phonograph. When visually comparing the sound effect of the voice of a person singing with the sound effect of a record being played upon the turntable 6 of the machine, the singer sings into the microphone 7, which may be plugged into the machine at the microphone input 8. The microphone output 9 is connected by conductors 10 with an input terminal 11, of electronic switch 12.

The phonograph is of the common electro-mechanical amplifying type in which the sound effects from the reproducing needle are amplified and delivered as electrical current. The output of this current is indicated at 13. This terminal is connected by conductors 14 to the other input terminal 15 of the electronic switch. The output terminal 16 of the electronic switch is connected by conductors 17 with the input terminal 18 of the oscillograph 19. The action of the electronic switch creates two separate and complete visual traces 20 and 21 upon the fluorescent screen 22, one of which visually depicts the sound delivered from the microphone and the other of which visually depicts the sound delivered from the phonograph record.

23 illustrates the conventional tone arm and 24 the conventional recording arm of a phonograph of this character. The various controls for the apparatus are illustrated upon the front panel 25 of the machine and these may be located anywhere desired and varied within wide ranges.

Figure 3:
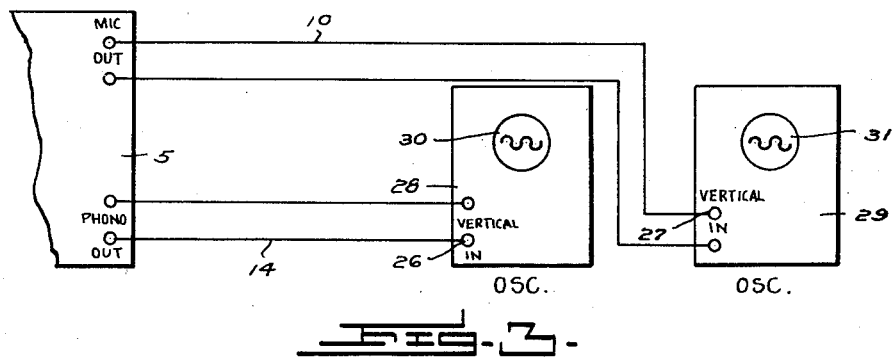
Fig. 3 is a block diagrammatic view of the apparatus wherein the sound patterns to be compared are produced upon the screens of separate oscillographs.

Fig. 3 differs from the structure just described in that instead of employing an electronic switch and a single oscillograph, the conductors 10 and 14 are connected to the input terminals 26 and 27 of separate oscillographs 28 and 29, so that single patterns are produced upon the fluorescent screens 30 and 31 disposed in such juxtaposition to each other as to permit the visual comparison of the produced sound effects.

From a consideration of the basic nature of the invention as thus broadly stated, it will be apparent that there are many advantages inherent in the invention. Among these may be mentioned the fact that it provides an efficient aid in overcoming deficiencies both in the speaking and singing voice. Psychologically, such aid is of importance. A machine which permits a performer to see his voice pattern contrasted with an ideal voice pattern representing his objective, aids in taking his mind off himself and overcoming self-consciousness and timidity by giving him visual assurance of the excellence of his effort.

When used in the training of students, the student need not work with an audience until ready. A selected record or a record especially prepared by the teacher will guide him both audibly and visually. He can go over and over his exercises, constantly watching and correcting by being able visually to note his own improvement. If desired, he can even make a final recording at the termination of his exercises through the medium of the recording arm 24, to "show" his degree of improvement.

The loud speaker S of the machine permits the teacher, if present, to exercise a monitoring function, this speaker delivering the result of the student's effort, at the microphone.

This apparatus does not impose upon the teacher or the student such hard and fast rules of instruction as are ordinarily resorted to. Each student may be treated individually with special guide records (to be played upon turntable 6) prepared after due consideration of his case. Further, by connecting the output of two microphones to the input terminals 11 and 15 of the electronic switch, with a student singing into one microphone and a teacher singing into the other microphone, the effort of the pupil may be visually compared with that of the teacher.

What has heretofore been said with respect to comparisons of the singing voice manifestly applies to spoken words, and thus visual instruction may be had in the direction of correct speech including cadence, tone, breath, volume, evenness and enunciation. Such comparisons will be of great help to persons learning to speak languages with which they are unfamiliar.

Comparisons of tonal qualities of musical instruments may also be had. In this field the subtle overtones of a perfected technique or the illusive quality of a selection rendered by a master upon a violin are submitted to a visual analysis wherein the slightest deviation from purity is instantly discernible.

These capabilities render this apparatus highly useful as an aid in overcoming voice and speech deficiencies, as an aid to vocal instruction, as an aid to instrumental instruction, and in the utilization of previously recorded ideal sounds as a performance standard. Further, the apparatus can be used to advantage in teaching to speak children who are born deaf. Many children are born deaf who have their vocal chords. This apparatus will give such children a visual tone guide, enabling them to see the result of their own vocal efforts even though they cannot hear them.

Figure 4:
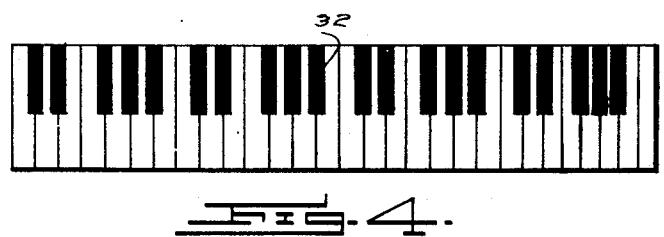
Fig. 4 is a plan view of a keyboard similar to that of an ordinary piano.

We further contemplate the provision of means which the sweep voltage generated by the time base circuit of the oscillograph may be continuously and manually modified to vary the horizontal scanning effect of the oscillograph. One apparatus for accomplishing this result is illustrated in Figs. 4 and 5. Fig. 4 comprises a keyboard made up of a plurality of keys 32, much like the keys of a piano. One of these keys, indicated at 33 in Fig. 5, carries a contact strip 34 which, when the key is depressed, makes contact with a contact strip 35, said key being pivoted at 36.

A stop 37 limits the downward movement of strip 34. A spring 38 acts to move the contact strips away from each other upon releasing the key. A conductor 39 leads to strip 34 and when the strips 34 and 35 contact each other a circuit is completed through a conductor 40. This conductor may include any suitable means for modifying the voltage of the time base circuit of the cathode-ray tube, such, for example, as the non-inductive resistance 41, capacitor 42, or otherwise.

There will be a separate conductor and associated circuit for each of the keys of the keyboard and these circuits will, by experiment, be "tuned" through elements such as 41 and 42 to suit the musical value of the notes represented by the several circuits. These circuits (only one of which is shown in Fig. 5) each include a relay coil 50 which acts to move the contacts 52 and 55 into engagement with either contacts 51 and 54 or contacts 53 and 56. These double contacts bring about changes of value in the circuit through such devices as resistance 41 and capacitor 42, simultaneously or separately as occasion may require.

It will be seen that when the relay coil is energized from power source 58 by the closing of contacts 34 and 35 by one of the keys, the modifying elements 41 and/or 42 are brought into play, while when the key is released, the relay acts to restore the normal oscillograph circuit and to cut out the said modifying elements controlled by that particular key. These latter circuits are in substance like those of Fig. 6. This figure represents a simple sweep frequency oscillator circuit (time base) wherein 60 represents a gas-filled triode or thyratron and 61 is a pentode vacuum tube. We here include in a circuit corresponding to circuit 40 a small trimming capacitor used in making fine adjustments of the value of the main capacitor 42. The importance of the means for thus controlling the frequency of the horizontal sweep will be best appreciated by a consideration of the following facts. Audible sounds are of various frequencies. Should the frequency of the horizontal sweep be of one rate and the frequency of the sound being introduced into the vertical deflection circuit be of another, no true or satisfactory sine-wave of that sound would appear on the screen of the cathode ray tube. On the other hand, if the horizontal sweep and the incoming sound are in proper relation to one another, a pure, or practical sine-wave results. Therefore, the function of the keyboard is such that by selection and depression of the proper key, or keys, in relation with the incoming sound, a practical and useful sine-wave pattern will result on the screen of the cathode ray tube.

Inasmuch as the purpose of the device is to make visual comparison and analysis of sounds of a continuous and/or modulating nature, it is essential that a means be incorporated that provides for dexterity in control over the voltages in the time base circuit effecting the frequency of the horizontal sweep. As the singing voice, or the melody of a musical instrument will most often be the sound to be studied, a piano-type, or 'musical' keyboard is selected as being the most advantageous and practical for this purpose.

Figure 7 shows (in block diagram) the relation of the keyboard to the time base circuit. This relationship and its function remains the same regardless of whether the sound comes from the phonograph elements, or from the microphone, or from two microphones. The control keyboard is of great importance.

Since the pitch of the voice or instrument is directly related to the "scale" as represented by the keyboard, the control keyboard is of great importance in studying and comparing sounds of changing frequency. When a student sings the scale, the keys corresponding to the musical scale would be depressed on the keyboard in order to insure the desired sine-wave pattern. This can apply equally to the scale played or sung and recorded on a phonograph record.

It is to be understood that the invention is not limited to the precise construction set forth, but that it includes within its purview whatever changes fairly come within either the terms or the spirit of the appended claims.

Having described our invention, what we claim is:

1. Apparatus of the character described, comprising two different sound-affected elements, means for converting the sound waves therefrom into two different sets of electrical impulses means for converting the said sets of electrical impulses into two separate, visual traces disposed in such relation to each other as to permit visual comparison therebetween and means for continually and manually varying one of said sets of electrical impulses to thereby modify the visual trace resulting therefrom to cause said latter trace to correspond to its companion trace.

2. Apparatus of the character described, comprising two different sound-affected elements, means for converting the sound waves therefrom into two separate sets of electrical impulses and means for converting the said electrical impulses therefrom into two separate, visual traces disposed in such relation to each other as to permit visual comparison therebetween, and means for continuously and manually modifying such electrical impulses throughout the operation of the apparatus.

3. In combination, a mechanically actuated sound producing element, means for converting the sound waves therefrom into a set of electrical impulses, and a voice actuated sound producing element, means for converting sound waves therefrom into a second set of electrical impulses, oscillographic means to which said electrical impulses are delivered and through which said separate sets of electrical impulses are converted into two separate visual traces disposed in such juxtaposition to each other as to permit of their visual comparison.

4. In combination, two separate sound producing elements, means for converting the sound waves therefrom into two separate sets of electrical impulses, an electronic switch to which said electrical impulses are delivered, an oscillograph, and means for connecting the output of the electronic switch to the input of the oscillograph, said oscillograph comprising means through which the said electrical impulses from the two sound-affected elements create two visual and separate traces upon the screen of the oscillograph in such juxtaposition as to permit of their visual comparison.

5. Apparatus of the character described, comprising means for playing a sound record, means for converting the sound waves from such record into electrical impulses, a microphone, means for converting the sound waves from the microphone into electrical impulses, oscillographic means, and means for delivering such separate electrical impulses to the oscillographic means, said oscillographic means comprising elements for converting such separate electrical impulses into two visual traces disposed in such juxtaposition as to permit of their comparison.

6. In combination, means for playing a sound record to produce sound waves, a microphone, an electronic switch, means for converting the sound waves from the microphone and the record into two separate sets of electrical impulses, means for delivering said electrical impulses to the input terminals of the electronic switch, an oscillograph having a fluorescent screen, means for delivering the output from the electronic switch to the input of the oscillograph, said oscillograph serving to exhibit upon its fluorescent screen two separate visual traces indicative of the character of the respective sounds delivered from the record and into the microphone in such juxtaposition as to permit of their visual comparison.

7. A structure as recited in claim 3, in combination with means for manually modifying the horizontal scanning effect of the time base circuit of the oscillographic means continuously throughout the production of the sounds to be compared.

8. A structure as recited in claim 3, in combination with a plurality of manually operable elements, a tuned circuit controlled by each of said elements, and means for connecting the tuned circuits into modifying relation to the oscillograph under control of such manually operable elements.

9. A structure as recited in claim 3, in combination with a keyboard comprising a plurality of manually operable keys, circuits controlled by said keys, means for connecting said circuits into operative relation to the oscillographic means under control of said keys and modifying means included in said circuits for changing the frequency of the time base of said oscillographic means.

10. An apparatus of the character described for visually comparing a set of voice-created sound waves with a set of mechanically produced sound waves for the purpose of matching the voice-created waves with the mechanically produced waves, comprising means for producing a set of master sound waves, a microphone, means associated with the microphone for producing a set of voice-created waves, means for converting the sound waves from the microphone and from the musical instrument into two separate sets of electrical impulses, an oscillograph of the cathode ray tube type, means for delivering the two separate sets of electrical impulses to the oscillograph through an electronic switch to impose upon the screen of the oscillograph two separate visual traces indicative of the character of the respective sounds delivered through the musical instrument and from the microphone in such juxtaposition as to permit their visual comparison, and manual control means for continually and varyingly controlling the frequency of the horizontal sweep of electrons on the cathode ray tube for the purpose of causing the trace indicative of the character of the sounds delivered from the microphone to match the trace indicative of the character of the sounds delivered from the musical instrument.

BARRY SHIPMAN.
ROBERT HILLS GUHL.

REFERENCES CITED

The following references are of record in the file of this patent:

UNITED STATES PATENTS

| Number | Name | Date |
| --- | --- | --- |
| 2,098,695 | Southwick | Nov. 9, 1937 |
| 2,152,955 | Coyne | Apr. 4, 1939 |
| 2,212,431 | Bly | Aug. 20, 1940 |
| 2,209,157 | Glunt | July 23, 1940 |